: US 8,401,782 B2
: Mar. 19, 2013

(12) United States Patent
Eidehall

(54) SYSTEM AND METHOD FOR ASSESSING VEHICLE PATHS IN A ROAD ENVIRONMENT

(75) Inventor: Andreas Eidehall, Molndal (SE)

(73) Assignee: Volvo Car Corporation, Gothenburg (SE)

( * ) Notice: Subject to any disclaimer, the term of this patent is extended or adjusted under 35 U.S.C. 154(b) by 503 days.

(21) Appl. No.: 12/557,813

(22) Filed: Sep. 11, 2009

(65) Prior Publication Data

US 2010/0076685 A1    Mar. 25, 2010

(30) Foreign Application Priority Data

Sep. 25, 2008   (EP) ..................................... 08165146

(51) Int. Cl.
   *G06F 17/10*   (2006.01)
(52) U.S. Cl. ....................................................... 701/301
(58) Field of Classification Search .......................... None
   See application file for complete search history.

(56) References Cited

U.S. PATENT DOCUMENTS

| 5,343,206 A | 8/1994 | Ansaldi et al. |
| 2004/0090117 A1 | 5/2004 | Dudeck et al. |
| 2007/0080825 A1* | 4/2007 | Shiller ........................... 340/903 |
| 2008/0061999 A1* | 3/2008 | Birk et al. ................... 340/686.1 |
| 2008/0125972 A1* | 5/2008 | Neff .............................. 701/300 |
| 2010/0023197 A1* | 1/2010 | Huang et al. ..................... 701/29 |

FOREIGN PATENT DOCUMENTS

EP   1898232 A1   3/2008

OTHER PUBLICATIONS

European Patent Office, European Search Report for the corresponding European patent application 08165146.5 mailed Apr. 3, 2009.

* cited by examiner

*Primary Examiner* — Thomas H. Tarcza
*Assistant Examiner* — Adam Alharbi
(74) *Attorney, Agent, or Firm* — Brooks Kushman P.C.

(57) ABSTRACT

A method and system for assessing vehicle paths in a road environment including a vehicle and external objects includes: determining a position and a dynamic state of the host vehicle and of each of the external objects; generating a plurality of paths that may be followed by the vehicle as it moves toward the external objects; and evaluating a cost associated with each of the paths, the cost based on a lateral acceleration experienced by the vehicle. Each path is made up of path segments, including: an initial path segment corresponding to the vehicle continuing along a selected route without consideration of the external objects, and a maneuver pair for each external object, each maneuver pair including a path segment passing to the left of the external object and a path segment passing to the right of the external object.

20 Claims, 7 Drawing Sheets

SYSTEM AND METHOD FOR ASSESSING VEHICLE PATHS IN A ROAD ENVIRONMENT

CROSS-REFERENCE TO RELATED APPLICATION

This application claims foreign priority benefits under 35 U.S.C. §119-(a)-(d) to EP 08165146.5 filed Sep. 25, 2008, which is hereby incorporated by reference in its entirety.

BACKGROUND

1. Technical Field

The invention relates to a method and system for assessing vehicle paths in a road environment, and in particular to a method and system for allowing a vehicle to avoid other vehicles it is approaching.

2. Background Art

Methods for assessing vehicle paths in a road environment belong to active safety systems which may be implemented to increase the safety and/or comfort for drivers. Vehicle path assessment systems and methods are used to assess the cost of a route that the vehicle may follow, typically in order to avoid an object that is positioned in a current direction of movement of the host vehicle. In some systems a set of external object may be detected and a set of alternative routes pairs, one to the left of the object and one to the right of the object are generated and the costs for these route pairs are calculated. This is done for all the objects independently of each other which may lead to a case wherein a low cost is associated with a route that is actually not feasible because it is in conflict with another object.

SUMMARY

According to one disclosed embodiment of the invention, a method of assessing vehicle paths in a road environment including a host vehicle and a plurality of external objects present within a detection zone includes the steps of:

determining a position, a velocity, and an acceleration of the host vehicle and a position, a velocity, and an acceleration of each of the external objects;

generating a plurality of paths that may be followed by the host vehicle as it moves toward the external objects, each path comprising one or more path segments and the path segments including:

an initial path segment corresponding to the host vehicle continuing along a route of travel without consideration of the external objects, and a maneuver pair for at least one of the external object, each maneuver pair including a first path segment passing to the left of the respective external object and a second path segment passing to the right of the respective external object; and evaluating a cost associated with each of the paths, the cost based on a lateral acceleration experienced by the host vehicle in following the path According to a further disclosed embodiment, the paths are generated for a set of future states of the host vehicle corresponding to consecutive passing of the external objects by following path segments at an initial or future state of the host vehicle.

Since the path generator considers both the initial state at which the host vehicle presently is located at and the future states at which the host vehicle is located beside the external objects by following, one by one, the suggested maneuver pairs in the initial state, a set of path segments will be generated for each future state. Hence a plurality of paths will result from the path segments generated at the initial state, which paths all are formed by initial path segments and path segments at future states of the host vehicle.

According to a further disclosed embodiment, the step of generating a plurality of paths comprises a process of recursively recalling a path segment procedure. The recursive recall of a path segment procedure enables an efficient assessment of hypothetical paths that may be taken to pass all the external objects and barriers that are present in the initial state.

According to a further disclosed embodiment, the process of recursive recalls is interrupted when an initial path segment is not in conflict with any of the external objects or all future states of the host vehicle have passed all of the external objects.

Further embodiments of the invention are disclosed in the following detailed description which follows.

BRIEF DESCRIPTION OF THE DRAWINGS

An embodiment of the invention will be described in further detail below with reference to a set of drawings, where.

DETAILED DESCRIPTION

Figure 1A:
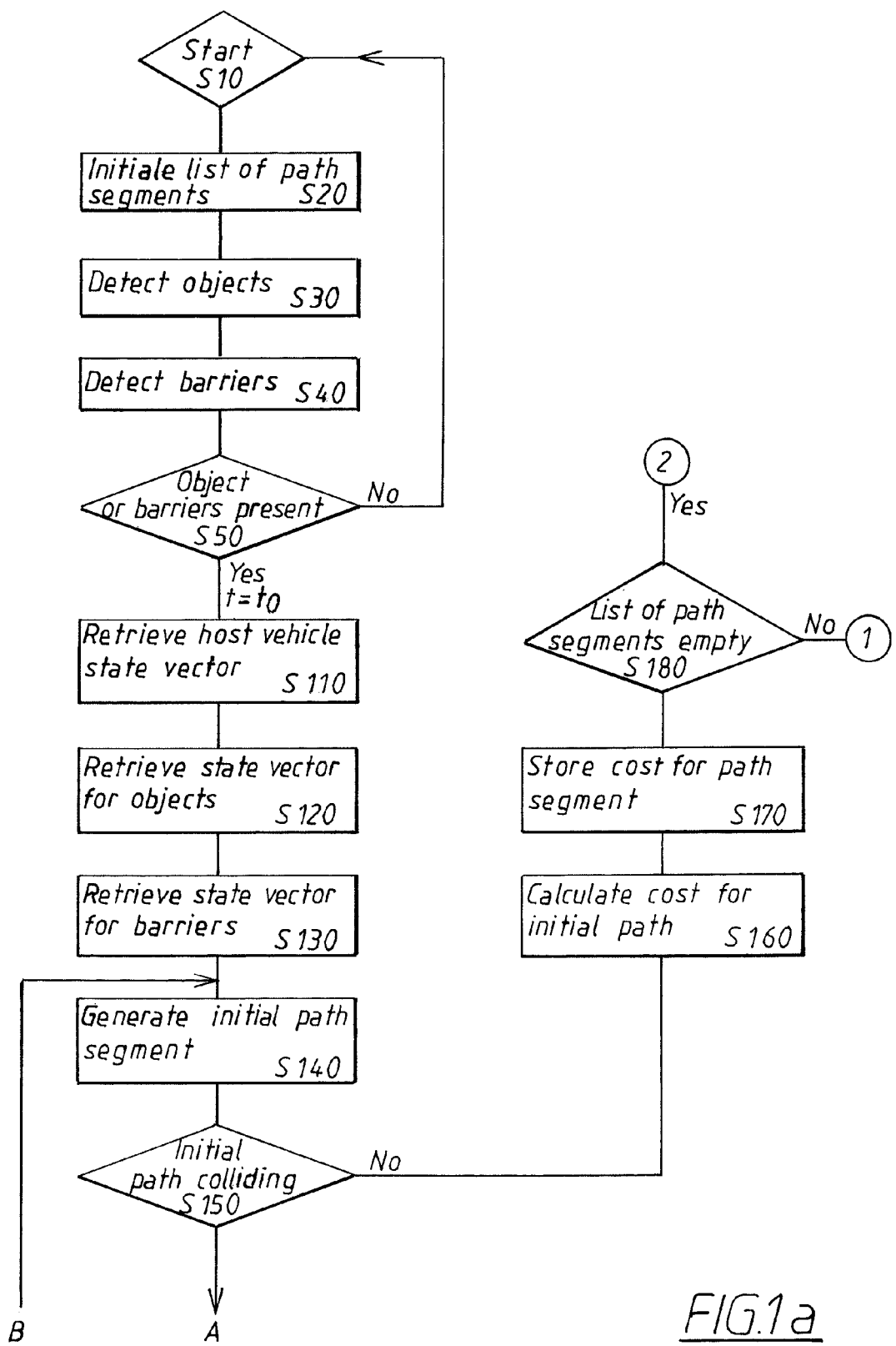
FIG. 1a is a first part of a flow chart showing a method of assessing vehicle paths in a road environment.
Figure 1B:
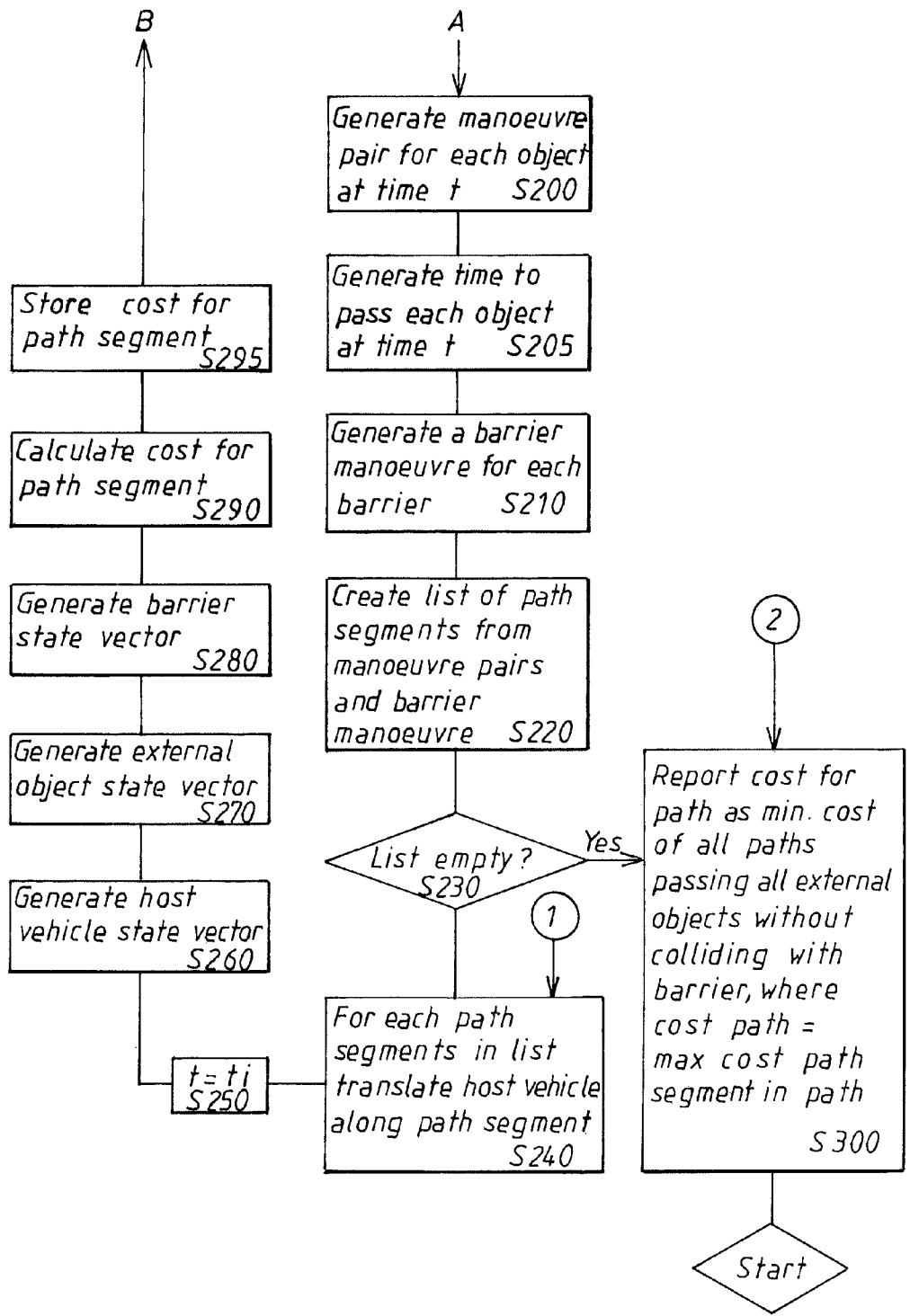
FIG. 1b is a second part of the flow chart of FIG. 1a, FIG. 2 is a schematic depiction showing an example of an initial state of a traffic situation.

In the flow chart of FIG. 1a, 1b, a method of assessing vehicle paths in a road environment begins at an initial step S10. The initiation may take place continuously as a road monitoring system updates the information of the road environment which changes due to the movement of a host vehicle and/or any external objects present in the vicinity of the host vehicle.

In step S20 a list of path segments is initiated. The list of path segments will not continue any path segments as this stage, since the list is generated at a later stage.

In step S30 external objects are detected by a sensor system. Operation of the sensor system to detect external objects is performed continuously in a conventional known manner.

In a step S40 barriers are detected. Barriers are fixed object in the environment. The barriers may be detected by the sensor system described above or via a map-type database containing the known locations of the barriers. The location of the barriers relative to the host vehicle may be retrieved by retrieving the location and direction of the host vehicle, for instance via a Global Positioning System (GPS) based vehicle navigation system, as is well known in the art.

In step S50 it is assessed whether any objects or barriers have been detected. If no barriers or objects are detected a recursive path segment procedure (step S110 et seq.) not started. If barriers and/or external objects are present, the recursive path segment procedure is initiated.

The recursive path segment procedure is initiated in step S110, where a host vehicle state vector $z_i$ is retrieved. The host vehicle state vector $z_t$ is initiated at the time t=t0 and typically represents the position and movement (velocity and acceleration) of the host vehicle.

In step S120 state vectors $x_i^t$ of the external objects i detected by the sensor system are retrieved.

In step S130 state vectors $y_j^t$ of barriers j are retrieved.

The state vectors may be generated in any known manner, preferably in a state observer arranged as a Kalman filter. Suitable systems for generation and updating of state vector are presented in Estimation with Applications to Tracking and Navigation (2002) by Yaakov Bar-Shalom, X. Rong Li, and Thiagalingam Kirubarajan, John Wiley & Sons, Inc., ISBN: 0471221279.

The state vectors are updated in real time in a vehicle surroundings monitoring system. At the initial time $t=t_0$, at the point which the vehicle path assessment system assesses how the host vehicle should pass all the external objects having a positive time to collision at the lowest cost, the vehicle path assessment system may thus effectively retrieve the state vectors from a vehicle surroundings monitoring system. Such systems, which generate state vectors for a host vehicle, a set of external objects present in a detection zone and a set of barriers are known to a person skilled in the art.

The initial state S=0 is the state S at the time $t=t_0$ when the assessment of a road environment takes place. In order to assess the environment of the host vehicle, the external object and the barriers are virtually translated to their positions at future states S=k. Each future state is present at a time $t=t_k$, when the host vehicle has been virtually translated along one or more path segments in order to arrive at the future state. Note that the future states do not correspond to an actual movement of the host vehicle. The host vehicle is still present at the initial state S=0 when the assessment is made of the different hypothetical paths which may be taken to pass the external objects.

In step S140 an initial path segment $p_i$ is generated at a time t. At the initial state, when $t=t_0$ the initial path segment is nominated $p_0$. At a future states S=k of the host vehicle the initial path segment nominated $p_k$. Generally, the initial path segment $p_k$ is a path segment corresponding to that path followed by the host vehicle at the initial or future state as it continues along a route of travel without consideration of or deviation for the external objects. The initial path segment $p_k$ is the movement which has the lowest cost associated thereto, since the host vehicle does not have to deviate to avoid any obstacles. Typically the initial path segment $p_k$ may correspond to the vehicle following its selected route without adding any additional maneuver. Hence, if the vehicle travels straight ahead, the initial path segment will correspond to the vehicle continuing straight ahead.

On the other hand, if the vehicle makes a turn at a certain lateral acceleration (for example in order to follow a curve in the road), the initial path segment will correspond to a route continuing the turn at the same lateral acceleration. Other models for generating an initial path segment may also be considered. For instance, the initial path segment may be a path segment where a steering wheel angular velocity is set to zero, corresponding to the vehicle continuing its selected movement or route at the initial state or future state of the vehicle. Furthermore, the initial path segment may be selected to be a path segment where the lateral acceleration is set to zero at the initial or future state of the vehicle, which corresponds to the case in which the vehicle will at the initial or future state drive straight ahead. Alternatively, the initial path segment may be selected as a path segment which follows the road coordinates at the initial and future state of the vehicle. The suggested approaches have selected different models for which maneuver should have the lowest cost allocated to it. Independently of which model has been selected the initial path segment at the initial and future states all have in common that these path segments correspond to the path having the lowest cost associated therewith.

In step S150 it is assessed whether the initial path segment is in conflict with any external object or barrier. If the initial path segment is not in conflict with any external object or barrier, the cost for the initial path segment may be calculated in a step S160 and the cost is stored is a step S170.

The cost for the initial path segment is set to be lower than the cost for all other maneuvers, because the system operates under the assumption that the driver wishes to continue the taken route as long as it is not in conflict with any barrier or external object.

In a situation where the lowest cost is associated with continuing the movement at the entry of the initial or future state, the following will apply. For any maneuver where the host vehicle departs from an initial path segment by changing the present lateral acceleration to be larger or smaller, a cost will be associated with it. Typically the cost of a maneuver may be assessed as the difference in lateral acceleration of the host vehicle between the lateral acceleration at the initial path segment and the lateral acceleration for a path segment having an altered route. That is:

$$\mathrm{cost}_{pathsegment\_i} = |\mathrm{lateral\_acceleration\_Initialpathsegment} - \mathrm{lateral\_acceleration\_pathsegment\_i}|$$

If other models are used the cost may alternatively be calculated as:

$$\mathrm{cost}_{pathsegment\_i} = \text{lateral acceleration for path segment I; or}$$

$$\mathrm{cost}_{pathsegment\_i} = \text{absolute steering wheel angular velocity for path segment I, or}$$

$$\mathrm{cost}_{pathsegment\_i} = \text{absolute difference of lateral acceleration required to follow road and lateral acceleration applied for path segment i.}$$

In step S180 it is assessed whether any more path segments are present in a list of path segments. The list of path segments for a state at time $t=t_i$ is generated at a step S220. (See FIG. 1b) In the event the initial path segment at time t=t0 (when the recursive path segment procedure is initiated) is not in conflict with any barrier or external object, it is evident that the host vehicle should continue the selected route along the initial path segment without making any maneuver, because all external objects will be passed and barriers may be avoided without modifying the selected route.

Since the list of path segments has been initiated but not generated, the list of path segments is empty and the operation may continue at step S300 where a report of the cost for an optimum path is generated. The optimum path has the minimum cost of all possible paths passing all external objects and avoiding the barriers, where the cost of a path equals the cost of the path segment in a path which as the highest cost.

A path is thus a set of path segments, each path segment corresponding to a maneuver which changes a taken route of the vehicle to avoid an external object or barrier. In the case in which the initial path at the initial state of the vehicle is not in conflict with any barrier or external object, the host vehicle may continue along its selected path since no better (lower cost) route exists. Hence, a further evaluation of alternative routes is not necessary. It is thus sufficient that a single value is reported in the step S300 in this case.

If, however, the initial path segment is in conflict with an external object or a barrier (step S150, YES), the recursive path segment procedure will continue at step S200 where a maneuver pair is generated for each external object having a positive time to collision. The maneuver pair includes a path segment passing the external object to the left and another path segment passing the external object/barrier to the right. Since an optimal solution requires that the host vehicle tangents the external object, the maneuver pair preferably is constituted by a path segment which tangents an external object on the left side and another path segment which tangents the external object on the right side.

In step S205 a time to pass each external object ti is calculated. Since the path segments are selected such that the host vehicle passes the external objects rather than colliding with them, the term "time to collision" is intended to mean the predicted time at which the host vehicle passes the external object. Preferably, the time to collision (or rather "time to pass") is the time at which the host vehicle is located besides the external object, preferably at a position which tangents the external object. A positive time to collision for an external object $E_i$ is denoted as $(t_i-t_+>0)$. Here $t_i$ is the time at which the host vehicle passes the external object $E_i$ and $t_k$ is the time at the state k of the host vehicle.

In a step S210 a barrier maneuver is generated for each barrier which is in conflict with a route taken by the host vehicle. The barrier maneuver is a maneuver which tangents the barrier without colliding with it at a minimum cost.

In step S220 a list L of path segments is generated which is constituted by all the maneuver pairs and the barrier maneuvers which do not collide with any external objects or barrier. The list L of path segments may be in the format as elements in row, as shown in Table 1. In the first row, the path segments for the initial state are presented. By following the path segments in the row, one by one, new states are assumed for the host vehicle and the external objects. For each element in the list in a row a subsequent list of path segments is present in a subsequent row in the event a path is not completed by the element in the list.

In step S230 it is assessed whether the list of path segments is empty or not. If the list is empty when the host vehicle is at its initial state, it is evident that no path segment exists which is not in conflict with either an external object or barrier. The routine may then proceed to an intervention control routine, which will ascertain that a correct intervention is made. On the other hand, if the list is empty after a cost for a path segment has been stored the operation will continue at step S300 where a report of the cost for an optimum path is generated. The optimum path is that having the minimum cost for all paths passing all external objects and avoiding the barriers, where the cost of a path equals the cost of the path segment in that path which having the highest cost.

On the other hand, if the list is not empty, the operation will continue at step S240 where the host vehicle is translated along one of the path segments in the list. The selected path segment is then removed from a list and added to a matrix which for all paths that allows the host vehicle to successfully avoid a conflict with all of the external objects and the barriers stores the path segments included in the paths.

Additionally, in step S250 the time at which the host would reach the position when it passes the external object, preferably so that the vehicle tangents the external object the side of it, or alternatively the time when host vehicle would tangent the barrier is calculated.

The process will continue at step S260, where a host vehicle state vector $z_t$ is generated. Here it is not sufficient to retrieve the host vehicle state vector $z_t$ from a vehicle surroundings monitoring system, since the host vehicle is virtually translated from an initial state (which describes the current position of the host vehicle) to a future state. The future states are not actual states which the host vehicle will physically assume once time has passed from the time at which the initial state is entered to the time at which the future state is assessed. Each future state is solely a possible or predicted location which the host vehicle will assume in the event it follows one or more path segments leading to the future state. The future state may however be calculated in a conventional manner in a state observer using the initial state, the path segments leading to a future state and the time at which the host vehicle will pass the external object at future state.

In step S270 state vectors $x_i^t$ of the external objects i detected by the sensor system are generated for the future state.

In step S280 state vectors $y_j^t$ of barriers j detected by the sensor system or identified in a map database are generated. In the event the state vectors for the barriers are described in a road coordinate system and not in a coordinate system fixed to the host vehicle, it is not necessary to update the state vector for the barriers at the future states since the position of these will remain constant.

In step S290, the cost for the path segment is calculated and the cost is stored in step S295. The most efficient manner for storing the cost is to store the cost which maximal of the cost for the actual path segment and the cost for the future states required to pass all the external objects preset at the state in case. This effectively reduces the number of costs that have to be stored when exploring a number of hypothetical paths which may be followed to successfully pass all external objects.

The host vehicle, barriers and external objects have now virtually been translated to a future state at the time $t=t_i$. The operation will now continue at step S140 using $t=t_i$ as input data. A new initial path segment at the future state will be calculated.

The algorithm continues until all the path segments in a list generated at the initial state have been explored. The cost for each hypothetical path including a path segment in the list may be stored as the maximum of the cost for the path segment in the list and the maximum cost for a future state following that path segment in the list. The path having the lowest cost in the list should be selected. Since a list is created at each consecutive future state, the algorithm will report back the optimum solution following a path segment in the list and the cost associated with the optimum path. When all the paths segments in the list have been processed the optimum route and the cost for the optimum routes may be presented.

The method described in connection with the flow chart of FIGS. 1a and 1b will generate, by a path generator, a plurality of paths passing the external objects, each of the paths being constituted by a plurality of path segments. The path generator is a control block in a vehicle path assessment system which for an initial state of the host vehicle generates an initial path segment corresponding to that path the vehicle follows from the initial state of the host vehicle without consideration of or deviation for the external objects. The path generator furthermore generates a maneuver pair for each external object having a positive time to collision, wherein the maneuver pair includes a path segment passing the external object to the left and another path segment passing the external object to the right. The maneuver pairs generated at the initial state may be nominated as $(p_i^L, P_i^R)$ S=0. The maneuver pairs generated at a future S=k state may be nominated as $(p_i^L, p_i^R)$ S=k.

Figure 2:
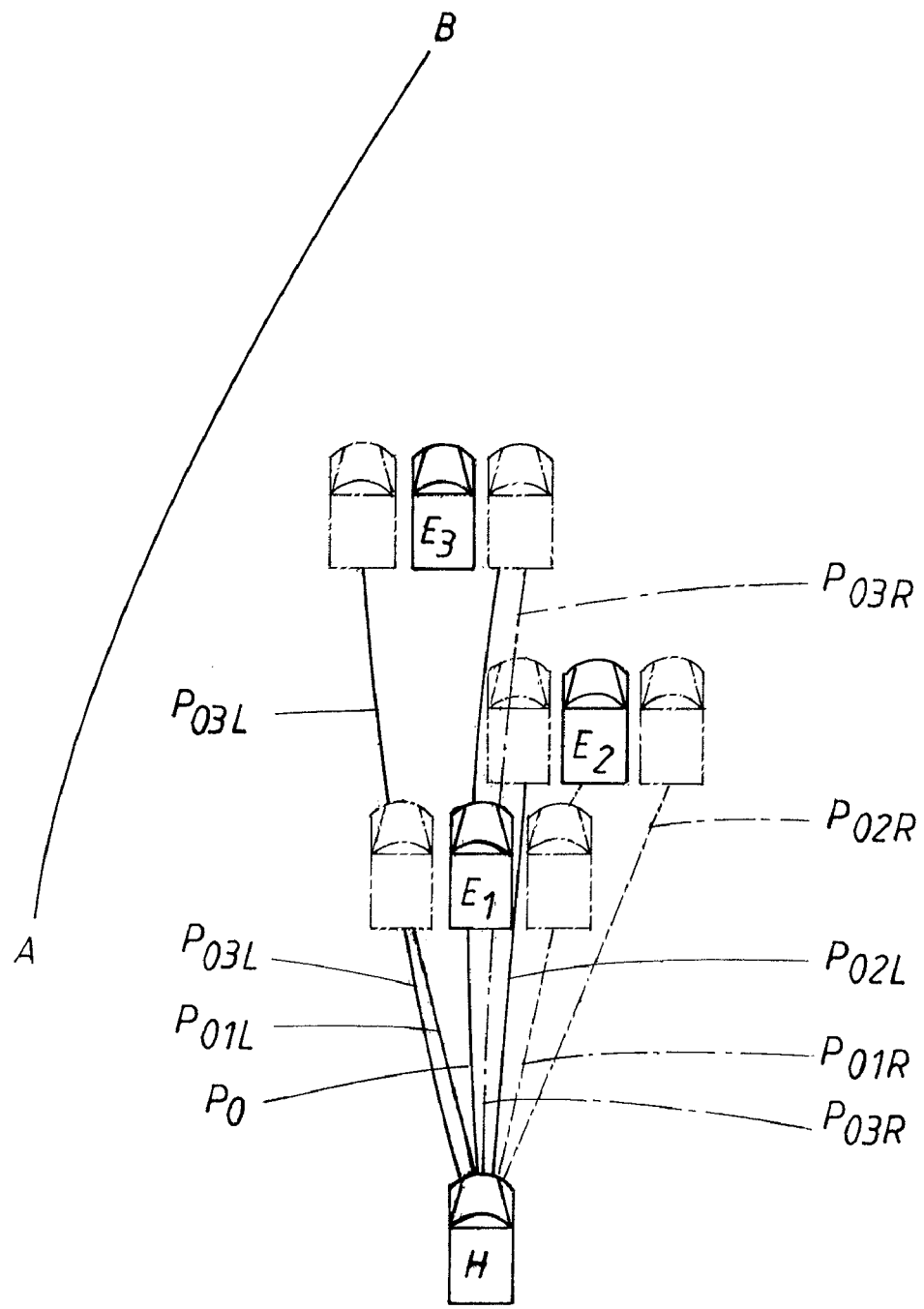

FIG. 2 depicts an example of an initial state. The initial state includes a host vehicle H and a set of external object E1, E2, and E3 detected by a sensor system. The states are determined in a state vector determination control block, which may be constituted by any known system which is capable of monitoring a traffic environment and keeping track of the position of external objects detected by a sensor system relative to a host vehicle. The path assessment system of the host vehicle has thus retrieved information that three external objects are within a detection zone of the sensor system of the host vehicle.

The host vehicle has a positive time to collision with respect to all three external objects. This means that the external objects are positioned in a forward direction of the host vehicle and that the relative speed of the host vehicle and each external object is such that the host vehicle eventually will pass each external object. The assessment is based on an initial state of the host vehicle and the external objects. Hence the situation may in reality change so that the host vehicle never passes any or all of the external objects. This is however immaterial in the assessment of the initial state. Other external objects may have been detected by the sensor system of the host vehicle, which external objects have state vectors indicating that the host vehicle never will pass the external objects, presumably because those external objects are travelling at a higher speed than the host vehicle. There is no need to generate paths for such external objects.

FIG. 2 depicts a set of path segments that includes an initial path segment p0 corresponding to travelling along the selected/required route from the initial state without consideration of or deviation for the external objects. As explained in connection with step S140 above, this may indicate that no correction to the current maneuver of the host vehicle will take place. Typically the host vehicle will follow a taken route, such as following the curvature of the road.

Furthermore, path segments constituting a maneuver pair for each external object are shown. For the external object E1, a path segment p01L passing to the left of E1 and a path segment p01R passing to the right of E1 are shown. For the external object E2, a path segment p02L passing E2 to the left and a path segment p02R passing E2 to the right are included. For the external object E3, a path segment p03L passing E3 to the left and a path segment p03R passing E3 to the right are included.

Here the notation is selected such that "0" at the first position of the subscript indicates that the path segments relates to the initial state of the host vehicle. The digit 1, 2, and 3 at the second position of the subscript indicates that the path segment relates to the first second and third external object. L and R indicate whether the path segment allows the host vehicle to pass the respective external object, preferably by tangenting the left or right side depending on the situation.

It should be noted that the path segments included in the maneuver pair are generated to be valid for a predicted position of the external objects at the time at which the host vehicle passes the external object concerned. In order to reduce the number of objects required to be handled by the system, it is possible to reduce the set of external objects such that it only includes external objects with a positive time to collision and which time is smaller than a set prediction time horizon. This means that objects that may be passed only after more than 5 seconds to 10 seconds, for example, may be excluded.

Among the set of path segments, it is noted that the initial path segment p0 corresponding to the case where the vehicle continues along its selected route is in conflict with at least one external object. Hence the host vehicle must make a maneuver in order to avoid colliding with the set of external objects E1-E3. If this was not the case there would be no need for assessing which maneuver of the set of hypothetical maneuvers will pass the external objects at lowest cost, since it is obvious that the maneuver which has the lowest cost is to continue along the initial path segment.

Of the generated set of path segments, we note that the path segments p02L and p03R are in conflict with the external object E1. These two path segments may thus be removed from a list of path segments. The list of path segments generated for the initial state thus includes the remaining path segments p01L, p01R, p02R, and p03L. The costs for the path segments are noted.

It is noted that the path segment p03L will pass all external objects having a positive time to collision at the initial state. Hence movement along the path segment p03L will complete a hypothetical path for passing all the external objects at the initial state. Hence the cost for a path that includes only the single path segment p03L will be noted as a cost C1 for a hypothetical path P1.

The position of the host vehicle will be relocated along the path segment. This relocation does not correspond to an actual relocation of the host vehicle, rather the relocation is a prediction of a future state of the host vehicle at the point in time where it passes one of the external objects. Furthermore, the state vectors of the external objects still having a positive time to collision with the host vehicle at that point in time are updated.

Also, the times remaining until the host vehicle passes the external objects are updated.

A barrier B is also depicted in FIG. 2, but for reasons of simplicity the routines presented in FIGS. 2-7 do not include the calculation of path segments avoiding the barrier.

Figure 3:
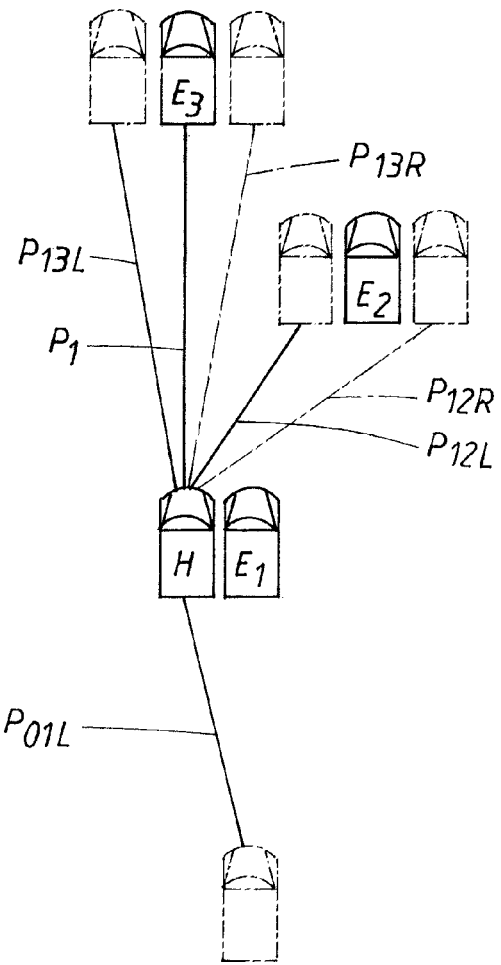
FIGS. 3-7 are schematic depictions showing various possible sets of future states following the initial state shown in FIG. 2.

FIG. 3 shows a first future state of the host vehicle and the external objects E1-E3 after the host vehicle has followed the path segment p01L.

The set includes an initial path segment p1 corresponding to the vehicle continuing along a route of travel from the future state reached by following the path segment p01L, without consideration of any external object in front of the host vehicle at the future state. As has been explained in connection with step S140 above, this may mean that no correction to the current maneuver of the host vehicle is made.

Furthermore, path segments constituting a maneuver pair for each external object which has a positive time to collision at the future state are shown. For the external object E2, a path segment p12L passing to the left of E2 and a path segment p12R passing to the right of E2 are included. For the external object E3, a path segment p13L passing E3 to the left and a path segment p13R passing E3 to the right are included.

Here the notation is selected such that "1" at the first position indicates that the path segments relate to a first future state of the host vehicle.

For the generated set of path segments we note that no path segment is in conflict with the external objects. Hence path segments p12L, p12R, p13L, and p13R are valid. The cost for each path segment is noted.

It is noted that the path segments p13L and p13R will pass all external objects having a positive time to collision at the first future state. Hence the assessment will generate a path for each one of these path segments.

Figure 4:
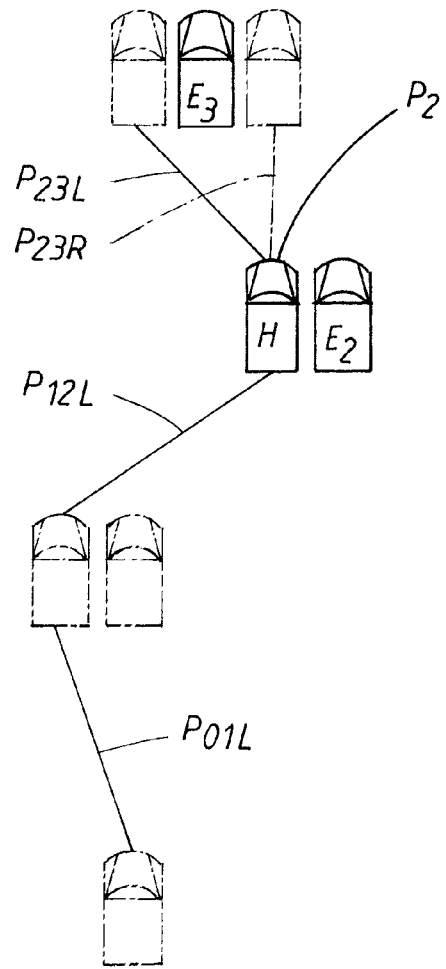

FIG. 4 shows a second future state of the host vehicle and the external objects E2 and E3 after the host vehicle has followed the path segments p01L and p12L determined in the previous two iterations.

The set includes an initial path segment p2 corresponding to the vehicle continuing along a selected/required route from the future state reached by following the path segment p12L identified in the previous iteration. The initial path segment p2 corresponds to a path taken without consideration of any external object in front of the host vehicle at the future state. As explained above in connection with step S140, this may mean that no correction to the current maneuver of the host vehicle is made.

For the external object E3, a path segment p23L passing E3 to the left and a path segment p23R passing E3 to the right is shown. In this case, path segment p23R coincides with the initial path segment p2.

Since the initial path segment p2 is valid it is not necessary to complete a path segment assessment of the path segments p23L and p23R, hence these paths segments do not need to be generated.

Here the notation is selected such that "2" at the first position indicates that the path segments relates to a second future state of the host vehicle.

The cost for the initial path segment p2 is noted.

Figure 5:
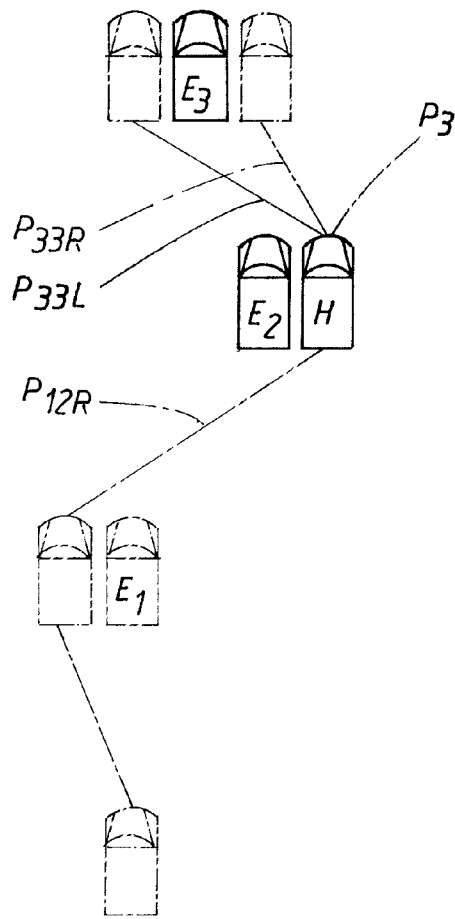

FIG. 5 shows a third future state of the host vehicle and the external objects E2-E3 after the host vehicle has followed the path segments p01L and p12R.

The set includes an initial path segment p3 corresponding to the vehicle continuing along its route from the future state reached by following the path segment p12R. The initial path segment p3 corresponds to a path taken without consideration of any external object in front of the host vehicle at the future state. As explained in connection with method step S140, this may mean that no correction to the current maneuver of the host vehicle is made.

For the external object E3 a path segment p33L passing E3 to the left and a path segment p33R passing E3 to the right is shown.

Since the initial path segment p3 is valid it is not necessary to complete a path segment assessment of the path segments p33L and p33R, hence these path segments do not need to be generated.

Here the notation is selected such that "3" at the first position indicates that the path segments relates to a third future state of the host vehicle.

The cost for the initial path segment p3 is noted.

Since all the path segments subsequent to first option p01L in the list of path segments have been explored until all external objects have been successfully passed, the assessment now turns to the next option p01R in the list of path segments generated for the initial state.

Figure 6:
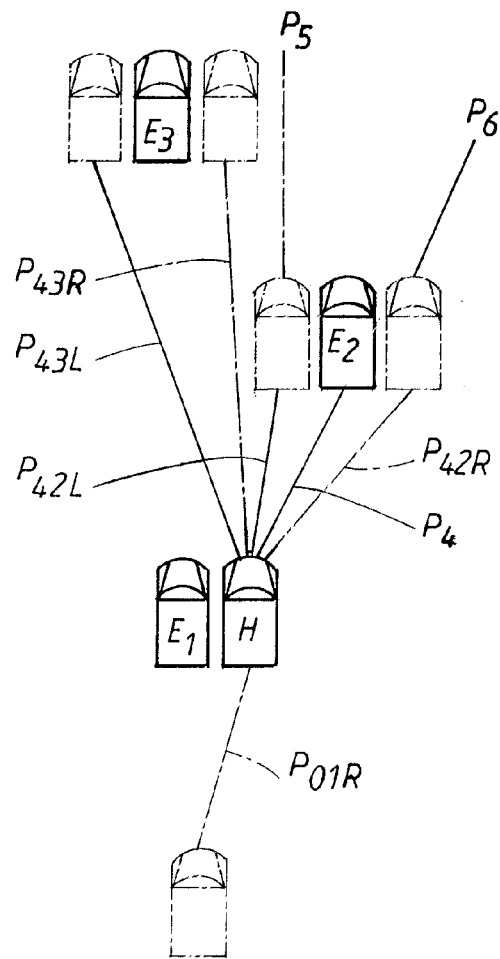

FIG. 6 shows a fourth future state of the host vehicle and the external objects E1-E3 after the host vehicle has followed the path segment p01R.

The set includes an initial path segment p4 corresponding to the vehicle following its initial path from the future state reached by following the path segment p01R. The initial path segment p4 corresponds to a path taken without consideration of any external object in front of the host vehicle at the future state. As have been explained in connection with method step S140, this may mean that no correction to the current maneuver of the host vehicle is made.

Path segments constituting a maneuver pair for each external object having a positive time to collision at the future state are also shown. For the external object E2 a path segment p42L passing E2 to the left and a path segment p42R passing E2 to the right are included. For the external object E3 a path segment p43L passing E3 to the left and a path segment p43R passing E3 to the right are included.

Here the notation is selected such that "4" at the first position indicates that the path segments relates to a fourth future state of the host vehicle.

For the generated set of path segments we note that no path segment is in conflict with the external objects. Hence path segments p42L, p42R, p43L, and p43R are valid. The cost for each of these path segments is noted.

It is noted that the path segments p43L and p43R will pass all external objects having a positive time to collision at the fourth future state. Hence the assessment will generate a path P for each one of these path segments p. Hence the definition of a path P is the sum of any path segment p included in the path P.

From FIG. 6 it is evident that the initial path segment p5 corresponding to the vehicle following its initial path from the future state reached by following the path segment p42L, and path segment p6 corresponding to the vehicle following its initial path from the future state reached by following the path segment p42R are not in conflict with any external objects. The initial paths correspond to paths taken without consideration of any external object in front of the host vehicle at the future state. As explained in connection with method step S140, this may mean that no correction to the current maneuver of the host vehicle is made.

Since the initial path segments p5 and p6 are valid it is not necessary to complete a path segment assessment of the other path segments. The costs for the initial path segments p5 and p6 are noted.

Figure 7:
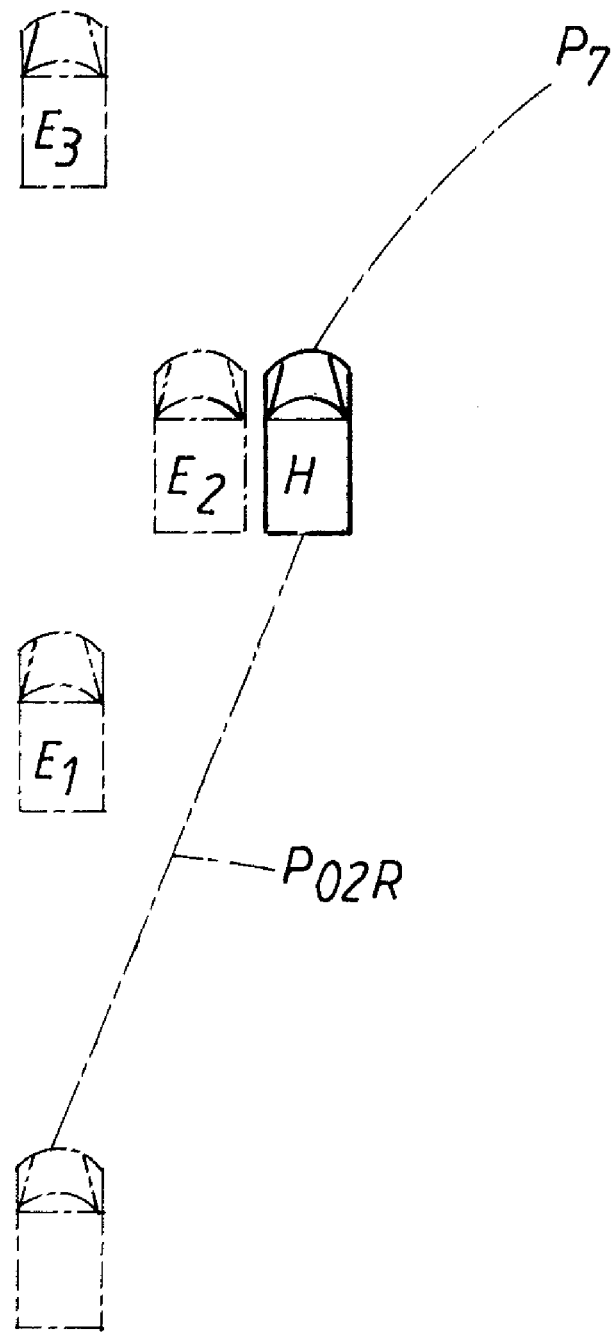

FIG. 7 shows a seventh future state of the host vehicle and the external objects E2-E3 when the host vehicle has followed the path segment p02R shown in FIG. 2.

The set includes an initial path segment p7 corresponding to the vehicle following its initial path at the future state reached by following the path segment p02R. The initial path segment p7 corresponds to a path taken without consideration of any external object in front of the host vehicle at the future state. As explained in connection with method step S140, this may mean that no correction is made to the current maneuver of the host vehicle.

Since the initial path segment p7 is valid it is not necessary to complete a path segment assessment of other path segments.

The cost for the path initial path segment p7 is noted.

Following the assessment of path segment p02R followed by initial path segment p7 the list of path segments at the initial state of the host vehicle is complete when all hypothetical paths has been explored.

A total of ten hypothetical paths have been found. The paths are as follows:

TABLE 1

| p01L c01L | | | | p01R c01R | | | | | |
|---|---|---|---|---|---|---|---|---|---|
| p12L c12L | p12R" c12R | | | p42L c42L | p42R" c42R | | | p02R c02R | |
| p2 c2 | p3 c3 | p13L c13L | p13R c13R | p5 c5 | p6 c6 | p43L c43L | p43R c43R | p7 c7 | p03L c03L |
| End | End | End | End | End | End | End | End | End | End |
| Cost path | Cost path | Cost path | Cost path | Cost path | Cost path P6 = | Cost path P7 = | Cost path | Cost path | Cost path |

TABLE 1-continued

| p01L | | | | p01R | | | | | |
| c01L | | | | c01R | | | | | |
|---|---|---|---|---|---|---|---|---|---|
| p12L | p12R" | | | p42L | p42R" | | | p02R | |
| c12L | c12R | | | c42L | c42R | | | c02R | |
| p2 | p3 | p13L | p13R | p5 | p6 | p43L | p43R | p7 | p03L |
| c2 | c3 | c13L | c13R | c5 | c6 | c43L | c43R | c7 | c03L |
| End | End | End | End | End | End | End | End | End | End |
| P1 = max (c01L, max (c12L, c2)) | P2 = max (c01L, max (c12R, c3)) | P3 = max (c01L, c13L) | P4 = max (c01L, c13R) | P5 = max (c01R, max (c42L, c5) | max (c01R, max (c42R, c6) | max (c01R, c43L) | P8 = max (c01R, c43R) | P9 = max (c02R, c7) | P10 = (c03L |

Optimum path = min (cost path P1 – P10)

In the table the first row correspond to a list L0 of path segments for an initial state, objects 1-4 in the second row corresponds to a second list L1 valid for a first future state when the host vehicle has followed the path segment p01L; and objects 5-8 in the second row corresponds to a third list L2 valid for a second future state when the host vehicle has followed the path segment p01R. In the third row and in the 9th element of the second row single initial path segments which are not in conflict with external object are listed. These elements do not belong to a list which should be explored because an initial path segment terminates a recursive recall.

Hence, it is evident from FIGS. 2-7 that the path generator generates a path segment corresponding to the vehicle following its selected route at said future state without consideration of the external objects, and further generates a maneuver pair for each external object having a positive time to collision, wherein the maneuver pair includes a path segment passing an external object to the left and another path segment passing the external object to the right. This is done for each future state until all future states of the host vehicle have passed all external objects. It is hence explored first whether an initial path segment at the future state will be in conflict with any external object. If this it the case a maneuver pair is created for each external object having a positive time to collision at the future state. The costs for these paths segments are noted at least if they are valid. In the event an initial path segment is not in conflict with an external object, the cost for this initial path segment is recorded as the cost for the initial path segment and no further path segments from this future state need to be explored. This routine may be repeated for a set of future states of the host vehicle corresponding to the consecutive passing of the external objects detected by the sensor system by following path segments generated by the path generator at the initial and future states of the host vehicle.

In an embodiment of the invention the path generator recursively recalls a path segment procedure which generates a path segment corresponding to the vehicle following its selected route at the initial or future state of the host vehicle without consideration of the external objects and a maneuver pair for each external object having a positive time to collision wherein the maneuver pair includes a path segment passing an external object to the left and another. It is not necessary to use a recursive algorithm, even though a recursive algorithm will be an efficient manner of exploring all hypothetical paths which may be taken to pass the external objects handled at the initial state of the host vehicle.

The recursive recalls may be made by translating the host vehicle along a list of path segments generated in a prior step and recalling the path segment procedure for the future state of the host vehicle at its translated position along the path segment.

The list may be based on all the maneuver pairs present in the prior step.

The list may include all the maneuver pairs present in the prior step which are not in conflict with any of the external objects.

The vehicle path assessment system may additionally detect barriers. In this case a barrier maneuver is generated for the initial state of the host vehicle and for all future states of the host vehicle. A barrier maneuver is a maneuver which tangents the barrier without colliding with it at a minimum cost, that for each state of the host vehicle, said barrier maneuver is added as a further path segment which may be followed by the host vehicle.

In table 1 above the cost for each path segment is recorded in a cost matrix M. The cost matrix M may be in the form of a table as presented above. The cost for each path is calculated as the maximum cost for the segments and initial path segments included in a path. Hence, a cost $C_m$ for each path $P_m$ is formed as the maximum cost maxck of any path segment $p_k$ included in the path $C_m$. Here the index m is selected to nominate different paths that may be taken to successfully pass the external objects $E_i$ and k is selected as an index for paths segments included in a path. The optimum path is selected as the path having the lowest cost.

A suitable method for assessment of paths may be expressed as follows:

I. Definitions $x_i^t$ State vector for object (other vehicles, pedestrians etc.) i at time t.

$y_i^t$ Barrier state vector for barrier i at time t.

$z^t$ Host vehicle state vector at time t.

$t_i^c$ Time to collision for object i p=(m; t) A maneuver of the host vehicle where m is a maneuver of the host vehicle and t is the length in time of this maneuver.

Cm Maneuver cost function; Cm(p) is the cost of maneuver p. The cost can be independent of the time and in that case, if p=(m; t), we have Cm(p)=Cm(m).

$P_{obj}$ is a prediction model for objects: $x_i^{t+\Delta t} = P_{obj}(x_i^t, m, \Delta t)$, where m is a host vehicle maneuver and $\Delta t$ is the prediction time.

$P_{barrier}$ is a prediction model for barriers: $y_i^{t+\Delta t} = P_{barrier}(y_i^t, m, \Delta t)$.

The barriers may or may not move depending on the choice of coordinate system. If they do not move, then $y_i^{t+\Delta t} = y_i^t$ for all $\Delta t$.

$P_{host}$ is a prediction model for the host vehicle. $z^{t+\Delta t}=P_{host}(z^t, m, \Delta t)$.

Algorithm

The algorithm starts at time zero with a set of objects with state vectors $x_i^0$, a set of barriers with state vectors $y_i^0$ and a host vehicle state vector $z^0$. If there are no objects or barriers, then abort the algorithm and return the cost zero.

For each object i compute the maneuver pairs $p_i^R=(m_i^R, t_i^e)$ and $p_i^L=(m_i^L, t_i^c)$. Here, $m_i^R$ and $m_i^L$ are the cheapest maneuvers (with the lowest cost according to Cm) required to tangent object i on the left and right side, respectively, and $t_i^c$ is the time to collision for object i. The maneuvers $m_i^R$ and $m_i^L$ are only valid until the time $t_i^c$.

Form the sets $M^R=\{p_i^R, i=1\ldots\}$ and $M^L=\{p_i^L, i=1\ldots\}$.

For each barrier j which is on collision course, compute the maneuver pairs $p_j^B=(m_j^B, t_j^c)$. Here, $m_j^B$ is the cheapest maneuver required to tangent barrier j and $t_j^c$ is the time to collision for barrier j given the maneuver $m_j^B$. Form the set $M^B=\{p_i^B, i=1\ldots\}$.

Form the common set of maneuvers $M=M^R \cup M^L \cup M^B$.

Add an initial path segment, which is a maneuver $p_0=(m_0, t_0)$ to the set M where $m_0$ is the cheapest possible maneuver not considering any objects or barriers and $t_0=\infty$ This typically means that the host vehicle keeps going straight and the cost of this maneuver is typically zero.

Remove all conflicting maneuver pairs, i.e., if a maneuver $(m, t) \in M$ leads to a conflict with an object i with $t_i^c<t$ or any of the barriers, then remove the pair from M.

If the maneuver $p_0$ is still in the set M, i.e., if $p_0$ is conflict free, then abort the algorithm and return the cost $Cm(p_0)$. Typically $Cm(p_0)=0$.

For all remaining maneuvers $p_k=(m_k, t_k)$ in the set M, repeat: Predict the state of all objects at time $t_k$, i.e., compute $x_j^{t_k}=P_{obj}(x_j^0, t_k, m_k)$.

Predict the state of all barriers at time $t_k$, i.e., compute $y_j^{t_k}=P_{barrier}(y_j^0, t_k, m_k)$.

Predict the host vehicle state at time $t_k$, i.e., compute $z^{t_k}=P_{host}(z^0, t_k, m_k)$.

Remove all objects with $t_i^c<t_k$.

Compute updated set of time to collision with external objects remaining. Updated time to collision is $t_i^{c,updated}=t_i^c-t_k$.

Call the algorithm again with the reduced set of objects and all predicted states $x_i^{t_k}$, $y_j^{t_k}$ and $z^{t_k}$.

For each maneuver, the algorithm will generate new maneuvers for the second step in the sequence. The algorithm returns a cost, say $C_k^{pred}$, associated with each predicted scenario.

Form $C_k=\max(C_m(p_k), C_k^{pred})$.

The final output of the algorithm is a sequence of maneuvers and by taking the max here the cost of the sequence will be the maximum of the cost of any of the maneuvers in the sequence.

Return mink(Ck) to select the path which has the lowest cost.

The cost for the most optimal path may be continuously updated and compared with a threshold value. If the cost exceeds a threshold value an intervention may be made by warning the driver, or applying the brakes.

Figure 8:
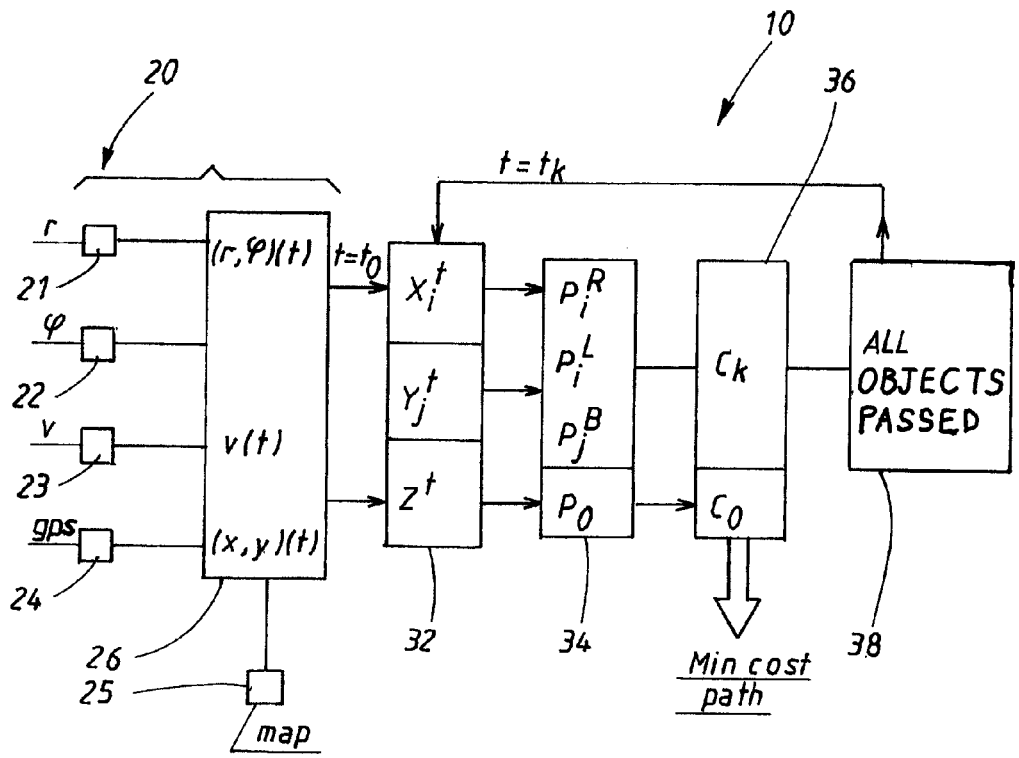
FIG. 8 is a simplified system block diagram of a vehicle path assessment system.
Figure 9:
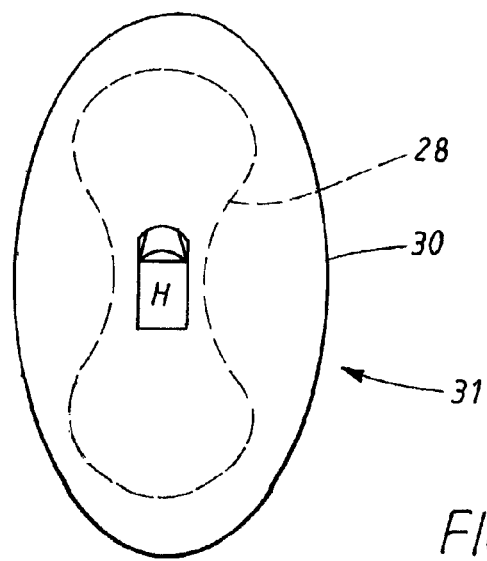
FIG. 9 is a schematic depiction showing a host vehicle with a detection zone for a sensor system.

FIG. 8 shows a vehicle path assessment system 10 to include a sensor system 20 for detecting external objects within a detection zone. The sensor system typically includes sensors 21-22 such as radars, lidars, and/or cameras capable of detecting the distance, direction and possibly the velocity of an external object. The sensor system furthermore includes sensors 23-24 capable of detecting the position and velocity of the host vehicle. The sensor system may include a GPS navigation system 24 and related map database 25 which locates the position of the host vehicle as well as the location of barriers relative to the host vehicle. Alternatively the sensor system may detect the location of barriers using radar and/or camera input signals in a conventional manner. The sensor system 20 may include a first control block 26 where the input signals are processed to generate position data $(r,\theta)(t)$ of the external objects and barriers and position data of the host vehicle A host vehicle H including a sensor system having a detection zone 28 is shown in FIG. 9. The sensor system may operate to detect external objects in an operating range 30 as indicated in FIG. 9. The detection zone 28 may form part of the operating range 30 where it is worthwhile monitoring the state of the external objects because a path of the host vehicle may collide with an external object within that zone. The detection zone and operating range are present in a road environment 31. It should be noted that the detection zone may not only include objects in front of the vehicle, but also objects behind the vehicle which may pass the host vehicle.

The sensor system 20 passes input signals to a state determination control block 32 which determines state vectors of external objects detected by the sensor system 20. The state determination control block may be a part of a conventional vehicle surroundings monitoring system, which in addition to keeping track of the host vehicle, external objects and barriers at a current initial state at a time $t=t_0$ also keeps track of the host vehicle, external objects and barriers at future states at a time $t=t_i$ corresponding to a time at which the host vehicle passes an external object I or tangents a barrier J.

A path generator control block 34 generates a plurality of paths passing said external objects. The path generator 34 is arranged to generate an initial path segment corresponding to the vehicle continuing to follow a path at the initial state of the host vehicle without consideration of the external objects, and to generate a maneuver pair for each external object having a positive time to collision, wherein the maneuver pair includes a path segment passing an external object to the left and another path segment passing the external object to the right, and a maneuver for each barrier which tangents the barrier at the end of a time horizon, which may be set to infinity or when information of the presence of the barrier is no longer available.

The path generator 34 is furthermore arranged to generate path segments, maneuver pairs, and barrier maneuvers as described above until all future states of the host vehicle have passed all external objects and/or as long as an initial path segment is in conflict with an external object, for all sets of future states of the host vehicle corresponding to the consecutive passing of the external objects detected by said sensor system by following path segments generated by the path generator at an initial or future state of the host vehicle.

The cost for each path segment is noted in a cost calculation block 36. In the cost calculation block 36 the cost for a path segment may be recorded as the maximum of the cost for the current path segment or any future path segment which is selected if following the current path. The cost for the path segments in a list generated for a current state is recorded as the minimum cost of the path segments in the list. The path segment having the lowest cost in the list will be followed. In a recursive loop controller 38, the algorithm is repeated to ensure that path segments are generated for consecutive future states at time $t=t_k$ until all external objects and barriers have been passed. When all path segments in the initial list have been explored, the system will be able to identify which is the optimum path to pass all external objects which have a positive time to collision and the cost associated with the optimum path.

The invention claimed is:

1. A method of assessing vehicle paths in a road environment including a host vehicle and a plurality of external objects present within a detection zone, the method including the steps of:
   determining a position, a velocity, and an acceleration of the host vehicle and a position, a velocity, and an acceleration of each of the external objects;
   generating a plurality of alternative paths that may be followed by the host vehicle in the future as it moves toward the external objects, each path comprising one or more path segments and the path segments including:
      at least one initial path segment corresponding to the host vehicle continuing along a route without consideration of the external objects, and
      a maneuver pair for at least one of the external object, each maneuver pair including a first path segment passing to the left of the respective external object and a second path segment passing to the right of the respective external object; and
   evaluating a cost associated with each of the paths, the cost based on a lateral acceleration experienced by the host vehicle in following the path.

2. A method according to claim 1, wherein the paths are generated for a set of alternative future states of the host vehicle corresponding to consecutive passing of the external objects by following path segments at an initial or future state of the host vehicle.

3. A method according to claim 2, wherein the set of alternative future states includes all future states of the host vehicle until the host vehicle has passed all of the external objects and/or as long as an initial path segment is in conflict with one of the external object.

4. A method according to claim 1, wherein the step of evaluating the cost for each path comprises allocating a cost to each path formed as the maximum cost of any path segment included in the path.

5. A method according to claim 1, wherein the step of generating a plurality of paths comprises a process of recursively recalling a path segment procedure.

6. A method according to claim 5, wherein the process is interrupted when an initial path segment is not in conflict with any of the external objects or all future states of the host vehicle have passed all of the external objects.

7. A method according to claim 6, wherein a cost for the initial path segment is recorded in a cost matrix.

8. A method according to claim 5, wherein the recursive recalls are made by translating the host vehicle along a list of path segments generated in a prior step and recalling the path segment procedure for the future state of the host vehicle at its translated position along the path segment.

9. A method according to claim 8, wherein the list of path segments is based on all the maneuver pairs present in the prior step.

10. A method according to claim 9, wherein the list of path segments excludes all the maneuver pairs present in the prior step which are in conflict with any of the external objects.

11. A method according to claim 10, wherein a cost for each path segment in the list is recorded in a cost matrix.

12. A method according to claim 11, wherein an optimum path is selected from the plurality of paths, the optimum path having a lowest cost associated with it.

13. A method according to claim 1, wherein the road environment includes at least one barrier and the step of generating a plurality of paths further comprises generating a barrier maneuver for avoiding the barrier.

14. A method according to claim 1, wherein the step of determining a position, a velocity, and an acceleration of the host vehicle and a position, a velocity, and an acceleration of each of the external objects comprises generating at least one state vector.

15. A vehicle path assessment system enabling a host vehicle to avoid a plurality of external objects present in a road environment comprising:
   a sensor system detecting the external objects;
   a state determination control block determining a position, a velocity, and an acceleration of the external objects and a position, a velocity, and an acceleration of the host vehicle;
   a path generator control block generating a plurality of alternative paths that may be followed by the host vehicle in the future as it moves toward the external objects, each path comprising one or more path segments and the path segments including:
      an initial path segment corresponding to the host vehicle continuing along a route of travel without consideration of the external objects; and
      a maneuver pair for at least one of the external object, each maneuver pair including a first path segment passing to the left of the respective external object and a second path segment passing to the right of the respective external object; and
   a cost calculation block evaluating a cost associated with each of the paths, the cost based on a lateral acceleration experienced by the host vehicle in following the path.

16. A vehicle path assessment system according to claim 15, wherein the path generator further generates a barrier maneuver for avoiding a barrier present in the road environment.

17. A vehicle path assessment system according to claim 15, wherein the path generator control block generates the paths by a process of recursively recalling a path segment procedure.

18. A vehicle path assessment system according to claim 15, wherein the sensor system comprises a GPS unit.

19. A vehicle path assessment system according to claim 15, wherein the state determination control block computes a state vector for the host vehicle and a state vector for at least one of the external objects.

20. A method of assessing vehicle paths in a road environment including a host vehicle and a plurality of external objects present within a detection zone, the method including the steps of:
   determining a position, a velocity, and an acceleration of the host vehicle and a position, a velocity, and an acceleration of each of the external objects;
   generating a plurality of path segments including:
      an initial path segment corresponding to the host vehicle continuing along a route of travel without consideration of the external objects, and
      a maneuver pair for at least one of the external object, each maneuver pair including a first path segment passing to the left of the respective external object and a second path segment passing to the right of the respective external object;
   generating a plurality of alternative paths, each path comprising at least one of the path segments and defining a route which the host vehicle may follow in the future to avoid collision with all of the external objects; and
   evaluating a cost associated with each of the paths, the cost based on a lateral acceleration experienced by the host vehicle in following the path.

* * * * *